United States Patent
Hirsch

(10) Patent No.: US 9,395,901 B2
(45) Date of Patent: Jul. 19, 2016

(54) PORTABLE ELECTRONIC DEVICE AND METHOD OF CONTROLLING SAME

(75) Inventor: Alexander Samson Hirsch, Highland Park, IL (US)

(73) Assignee: BlackBerry Limited, Waterloo (CA)

(*) Notice: Subject to any disclaimer, the term of this patent is extended or adjusted under 35 U.S.C. 154(b) by 724 days.

(21) Appl. No.: 13/369,023

(22) Filed: Feb. 8, 2012

(65) Prior Publication Data

US 2013/0201108 A1 Aug. 8, 2013

(51) Int. Cl.
*G06F 3/02* (2006.01)
*G06F 3/0488* (2013.01)
*G06F 1/16* (2006.01)

(52) U.S. Cl.
CPC ........... *G06F 3/0488* (2013.01); *G06F 1/169* (2013.01); *G06F 1/1692* (2013.01); *G06F 3/04883* (2013.01); *G06F 3/04886* (2013.01); *G06F 2203/04808* (2013.01)

(58) Field of Classification Search
CPC ........... G06F 3/0488; G06F 3/04883; G06F 3/04886; G06F 2203/04808; G06F 2203/04104; G06F 2203/04806
See application file for complete search history.

(56) References Cited

U.S. PATENT DOCUMENTS

| | | | |
|---|---|---|---|
| 8,199,125 B2* | 6/2012 | Misawa et al. | 345/173 |
| 2006/0001650 A1* | 1/2006 | Robbins et al. | 345/173 |
| 2006/0066588 A1* | 3/2006 | Lyon et al. | 345/173 |
| 2006/0161871 A1* | 7/2006 | Hotelling | G06F 3/0485 715/863 |
| 2006/0238517 A1 | 10/2006 | King et al. | |
| 2008/0036743 A1* | 2/2008 | Westerman et al. | 345/173 |
| 2009/0315848 A1* | 12/2009 | Ku et al. | 345/173 |
| 2010/0053111 A1* | 3/2010 | Karlsson | G06F 3/04883 345/174 |
| 2010/0064261 A1 | 3/2010 | Andrews et al. | |
| 2010/0171711 A1* | 7/2010 | Mak-Fan et al. | 345/173 |
| 2010/0207901 A1 | 8/2010 | Shin | |
| 2010/0283747 A1* | 11/2010 | Kukulski | G06F 3/0488 345/173 |
| 2011/0016416 A1* | 1/2011 | Meretab | 715/764 |
| 2011/0018895 A1* | 1/2011 | Buzyn et al. | 345/594 |
| 2011/0018896 A1* | 1/2011 | Buzyn et al. | 345/594 |
| 2011/0060986 A1 | 3/2011 | Yang | |
| 2011/0209057 A1 | 8/2011 | Hinckley et al. | |
| 2011/0209098 A1 | 8/2011 | Hinckley et al. | |

(Continued)

FOREIGN PATENT DOCUMENTS

| | | |
|---|---|---|
| EP | 1942401 A1 | 7/2008 |
| KR | 10-2011-0127556 A | 11/2011 |
| KR | 10-2012-0006278 A | 1/2012 |

OTHER PUBLICATIONS

International Search Report and Written Opinion dated Oct. 24, 2012, issued in respect of corresponding International Patent Application No. PCT/US2012/024337.

(Continued)

*Primary Examiner* — Amare Mengistu
*Assistant Examiner* — Crystal A Mathews
(74) *Attorney, Agent, or Firm* — Borden Ladner Gervais LLP; Geoffrey Dekleine

(57) ABSTRACT

A method includes detecting, on a touch-sensitive display of an electronic device, a touch. When no secondary input to the electronic device is detected during the touch, a first function associated with the touch is performed according to a first event handling process. When a secondary input is detected that overlaps at least partially in time with the touch, a second function associated with the touch is performed according to a second event handling process.

15 Claims, 4 Drawing Sheets

(56) References Cited

U.S. PATENT DOCUMENTS

| | | | |
|---|---|---|---|
| 2011/0210931 A1* | 9/2011 | Shai | 345/173 |
| 2011/0221666 A1 | 9/2011 | Newton et al. | |
| 2012/0001922 A1* | 1/2012 | Escher et al. | 345/467 |
| 2012/0019452 A1* | 1/2012 | Westerman | 345/173 |
| 2012/0127206 A1* | 5/2012 | Thompson et al. | 345/661 |
| 2012/0233545 A1* | 9/2012 | Ikeda et al. | 715/702 |
| 2013/0093685 A1* | 4/2013 | Kalu et al. | 345/173 |
| 2013/0093691 A1* | 4/2013 | Moosavi | 345/173 |

OTHER PUBLICATIONS

"Palm Pre(TM) Phone User Guide", Dec. 1, 2009, pp. 41-62, XP055223155, Retrieved from the Internet: URL:http://support.sprint.com/global/pdf/user_guides/palm/pre/palm_pre_ug.pdf [retrieved on Oct. 23, 2015].

Extended European Search Report dated Nov. 4, 2015, issued in respect of corresponding European Patent Application No. 12868313.3.

* cited by examiner

PORTABLE ELECTRONIC DEVICE AND METHOD OF CONTROLLING SAME

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
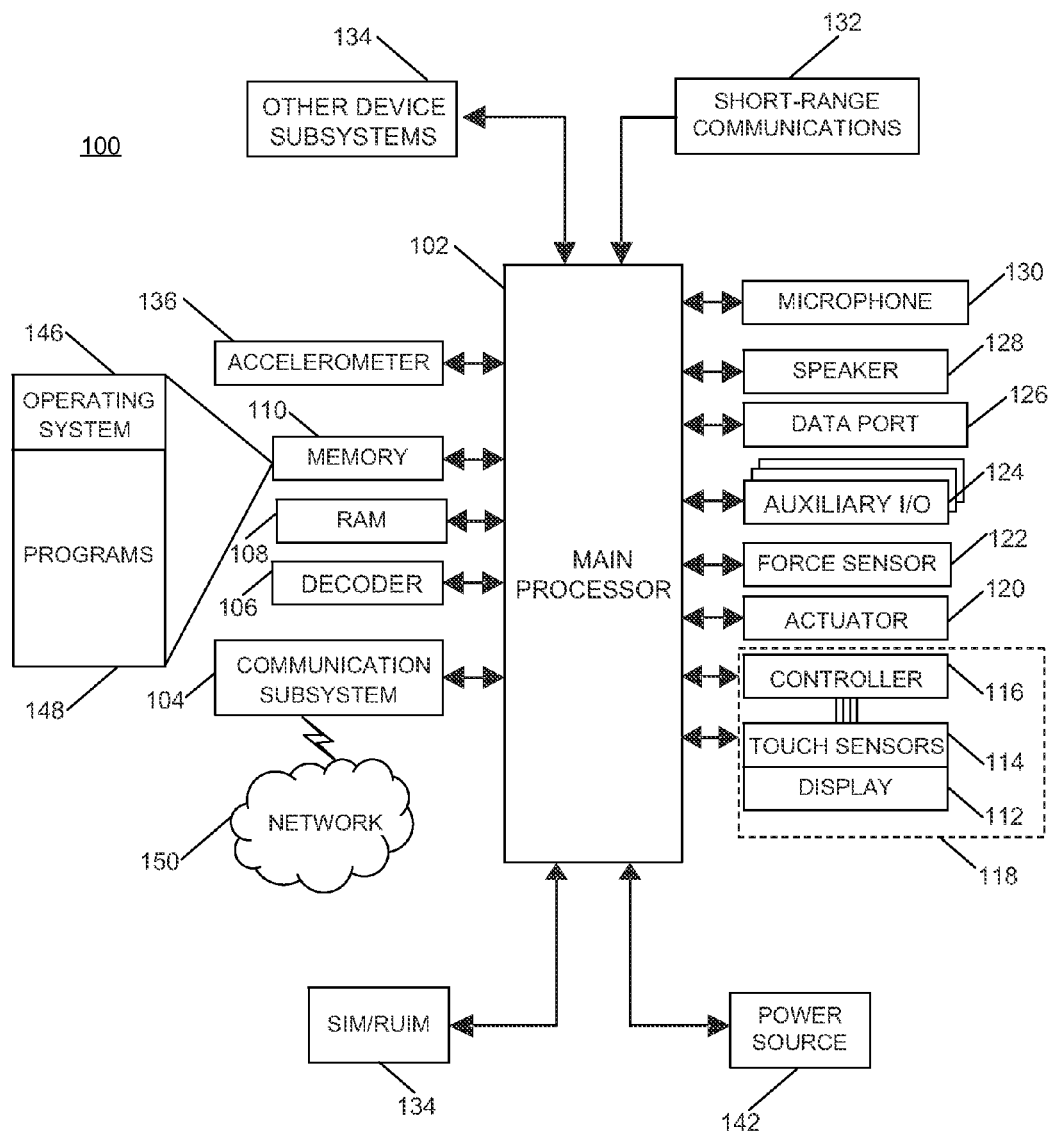
FIG. 1 is a block diagram of a portable electronic device in accordance with the disclosure.

The following describes an apparatus and method of detecting a touch on a touch-sensitive display of an electronic device. When no secondary input to the electronic device is detected during the touch, a first function associated with the touch is performed according to a first event handling process. When a secondary input is detected that overlaps at least partially in time with the touch, a second function associated with the touch is performed according to a second event handling process.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The electronic device may be a portable electronic device without wireless communication capabilities, such as a handheld electronic game, digital photograph album, digital camera, media player, e-book reader, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 3:
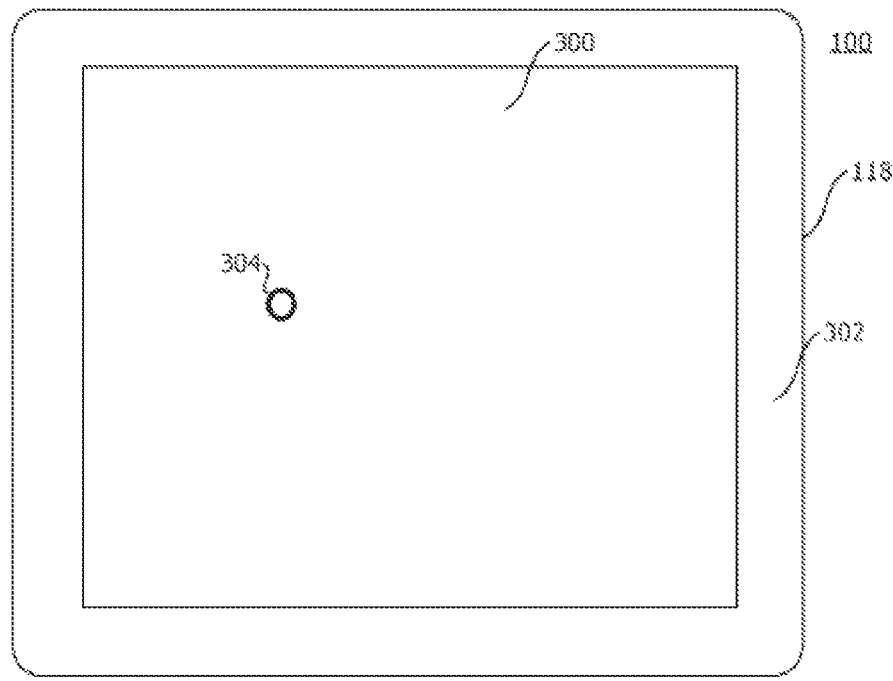
FIG. 3 illustrates a touch at a location on a touch-sensitive display of an electronic device in accordance with the disclosure.

The touch-sensitive display 118 includes a display area 300 in which information may be displayed, and a non-display area 302 extending around the periphery of the display area 300, such as shown in the example of FIG. 3. The display area 300 generally corresponds to the area of the display 112. Information is not displayed in the non-display area 302 by the display, which non-display area 302 is utilized to accommodate, for example, electronic traces or electrical connections, adhesives or other sealants, and/or protective coatings around the edges of the display area 300. The non-display area 302 may be referred to as an inactive area and is not part of the physical housing or frame of the electronic device. Typically, no pixels of the display are in the non-display area 302, thus no image can be displayed by the display 112 in the non-display area 302. Optionally, a secondary display, not part of the primary display 112, may be disposed under the non-display area 302. Touch sensors may be disposed in the non-display area 302, which touch sensors may be extended from the touch sensors in the display area 300 or distinct or separate touch sensors from the touch sensors in the display area 300. A touch, including a gesture, may be associated with the display area 300, the non-display area 302, or both areas. The touch sensors may extend across substantially the entire non-display area 302 or may be disposed in only part of the non-display area 302.

When a touch event is detected by the touch controller 116, an event handler process, also known as an event listener or an event handler, associated with an application is notified of the event, and performs a function or action in response to the event. For example, when a touch is detected at the location of an icon, the icon may be selected, and the function associated with the icon may be executed.

The portable electronic device 100 may support only a limited number of touches. For example, event handling processes may be provided to respond to a simple touch, navigation gestures, such as swipes, and re-sizing gestures, such as pinch and zoom gestures. The limited number of supported gestures may not provide all the functionality of a comparable desktop environment. For example, in a desktop environment, a mouse hover over a hypertext link may result in the link target address being displayed. Similarly, a mouse hover over an icon may result in the icon name, or function, being displayed. However, due to the difficulty in differentiating between a simple touch and a hover, event handling processes in a portable electronic device, such as device 100, are generally set to execute a command when a simple touch is detected, and do not differentiate between a simple touch and a hover. Accordingly, devices with touch-sensitive displays may be unable to respond, or may respond unexpectedly or inappropriately, to touches, such as a hover.

Figure 2:
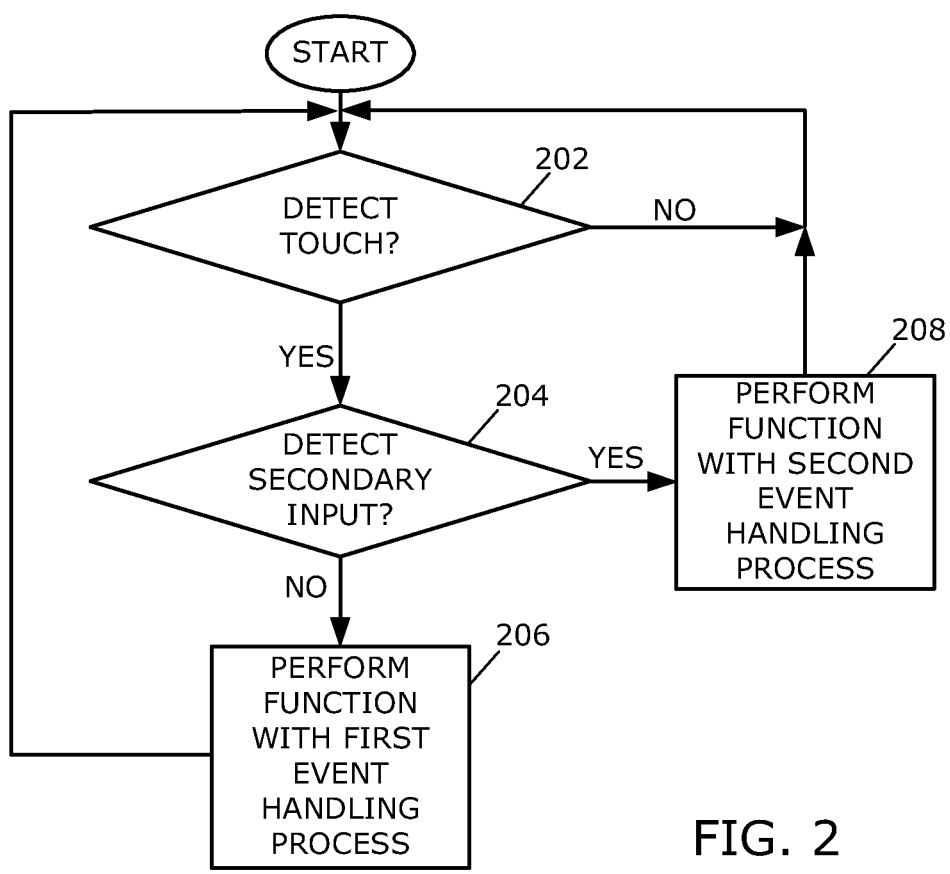
FIG. 2 is a flowchart illustrating a method of performing a function associated with a touch in accordance with the disclosure.

A flowchart illustrating a method of performing functions associated with a touch according to a first or a second event handling process is shown in FIG. 2. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

A touch is detected 202 on a touch-sensitive display of the electronic device 100. When no secondary input overlapping the touch at least partially in time is detected, also referred to as an overlapping input, a first function associated with the touch is performed 206 according to a first event handling process. The first event handling process may be one of a set of first event handling processes for handling different touches in a first manner. For example, the first set of event handling processes may include processes for processing a simple touch as a command to select a button or icon associated with a location of the touch, and execute a function associated with the button or icon; for processing a swipe gesture as a command to navigate from one page of a website, or document, to an adjacent page; and for processing a pinch and zoom gesture as a command to zoom in or out on a displayed page.

When a secondary input is detected 204, a second function associated with the touch is performed 206 according to a second event handling process. For example, the secondary input may be a second touch, such as a touch and hold gesture, a series of second touches, such as one or more taps, actuation of a key on a keyboard, actuation of a physical button or key on the portable electronic device 100, or any other secondary input that overlaps the touch at least partially in time. The terms "secondary" and "second" do not indicate a time order of touches and inputs. A secondary input that overlaps the touch at least partially in time may begin before, after, or at the same time the touch begins. A secondary input that overlaps the touch at least partially in time may end before, after, or at the same time the touch ends. The second event process may be one of a set of second event handling processes for handling touches in a second manner. For example, the second set of event handling processes may include processes for processing a simple touch as a rollover command to display information about a hyperlink target address or a menu item; for processing a swipe gesture as a command switch to another active application; and for processing a pinch and zoom gesture as a command to rotate a displayed image.

According to an example, when the secondary input is maintained, such as by continuing to depress a pre-assigned key on a keyboard or by holding a touch, the electronic device may process a subsequent touch according to one of the set of second event handling processes. When the secondary input ends, or is terminated, such as by release of a keyboard key or the end of the touch, the electronic device may process a subsequent touch according to one of the set of first event handling processes.

Figure 4:
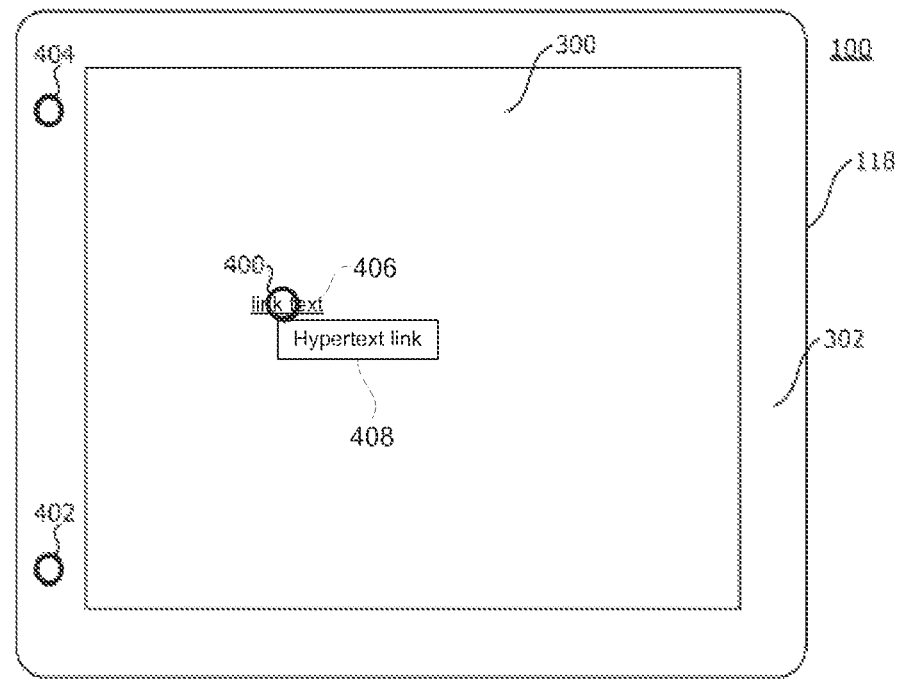
FIG. 4 illustrates a touch at a location on a touch-sensitive display of an electronic device in accordance with the disclosure.

An example of detecting a touch on a portable electronic device is shown in FIG. 3 and FIG. 4. When a touch at a location 304 is detected within a first region, such as display area 300, and no secondary input is detected that overlaps the touch at least partially in time, the touch is processed according to a first event handling process. For example, the location 304 may be associated with a button or icon displayed in the display area 300. When a touch is detected at the location 304 and no secondary input to the electronic device 100 is detected that overlaps the touch at least partially in time, a first event handling process may execute a command associated with the button or icon. When, as shown in FIG. 4, a touch at a location 400 is detected in the display area 300, and a secondary input, such as a second touch at location 402, that overlaps the touch at least partially in time, is detected in a second region, such as non-display area 302, a second event handling process may process the touch. For example, the location 400 may be associated with a hyperlink 406, and the second event handling process may perform a function, such as a rollover function to display a hypertext link 408 associated with the hyperlink.

More than one second event handling process, e.g., a set of second event handling processes, may be available for processing touches. Selection of a second event handling process may be determined by the secondary input to the electronic device 100. For example, as shown in FIG. 4, when a second touch is detected at a location 402 in the lower left area of the non-display area 302, a second event handling process, associated with a first set of set of second event handling processes, may process the touch, and perform a rollover function as described above. When a second touch is detected at a location 404 in the upper left area of the non-display area 302, a second event handling process, associated with a second set of set of second event handling processes, may process the touch to perform a function to highlight, or indicate selection of, text associated with the location 400. By way of further example, in an electronic device having a physical keyboard, a second event handling processes may be selected or invoked by actuating a first pre-assigned key, while another second event handling process may be selected or invoked by actuating a second pre-assigned key.

Figure 5:
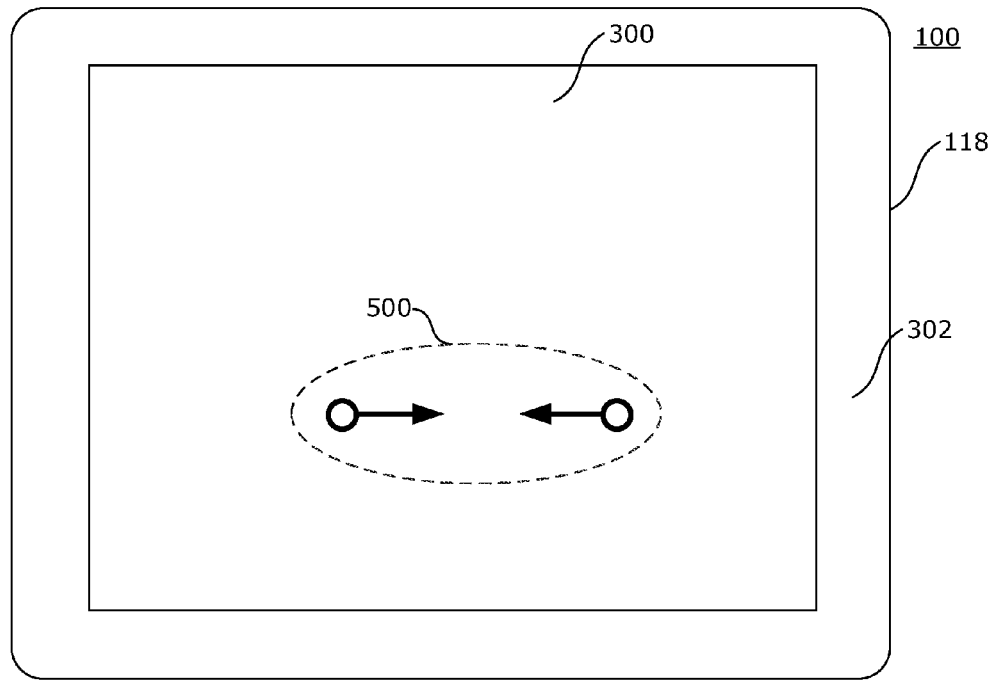
FIG. 5 illustrates a touch at a location on a touch-sensitive display of an electronic device in accordance with the disclosure.
Figure 6:
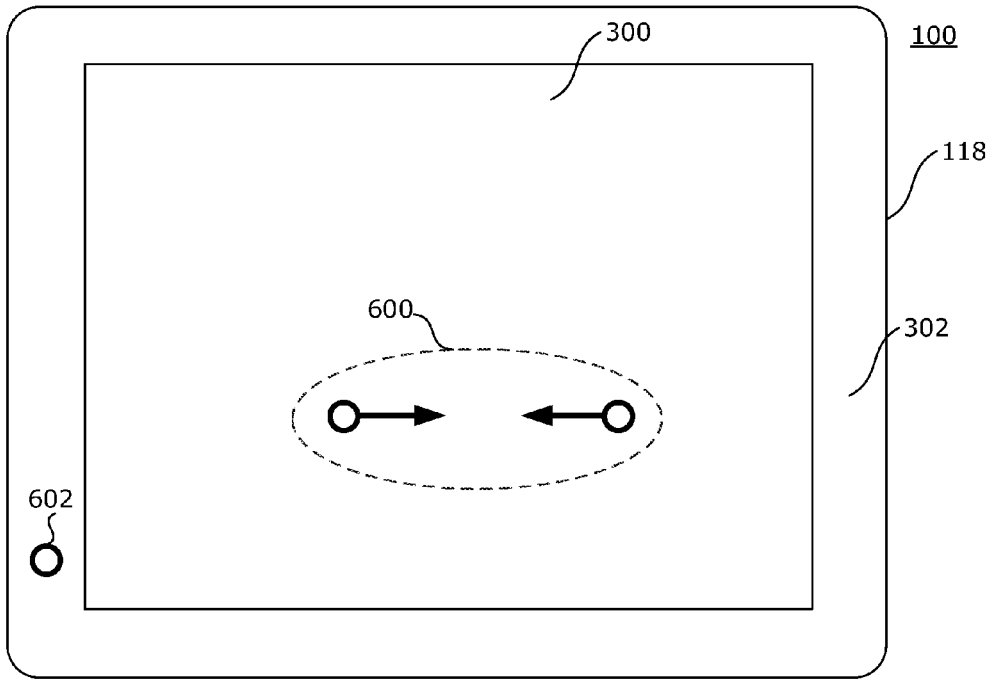
FIG. 6 illustrates a touch at a location on a touch-sensitive display of an electronic device in accordance with the disclosure.

Additional examples of detecting a touch on a portable electronic device are shown in FIG. 5 and FIG. 6. When a gesture, such as pinch gesture 500, is detected within a first region, such as display area 300, and no secondary input is detected that overlaps the gesture at least partially in time, the gesture is processed according to a first event handling process. For example, when a pinch gesture 500 is detected in the display area 300, without detection of a secondary input to the electronic device 100, a first event handling process may perform a zoom out function, causing a displayed image to be reduced in size or resolution. When, as shown in FIG. 6, a pinch gesture 600 is detected in the display area 300, and a secondary input, such as touch and hold gesture 602, is detected in a second region, such as non-display area 302, at least partially overlapping in time with the gesture 600, a second event handling process may process the gesture 600. For example, the second event handling process may perform a function, such as a rotate function to rotate an image or a page displayed at a location associated with the gesture 600.

In a portable electronic device 100 that includes a physical keyboard (not shown), the secondary input may be, for example, the depression of a pre-assigned key, such as an ALT key. When a touch is detected on the touch-sensitive display 118, and no pre-assigned key is actuated overlapping the touch at least partially in time, the touch may be processed according to a first event handling process. For example, when a button or icon is associated with the location of the gesture 600, the first event handling process may execute an operation associated with a button or icon. When a touch is detected on the touch-sensitive display 118, and the actuation of a pre-assigned key, overlapping the touch at least partially in time, is detected, a second event handling process may process the touch, and perform a second function, such as a rollover function.

The present method and apparatus increases the number of functions that may be supported through a limited number of touches or gestures. By switching, changing, or toggling, between two or more event handling processes, the number of commands and processes associated with touches is multiplied without the electronic device needing to detect any new or additional gestures that may be complicated. User experience is also improved, because a limited number of gestures is provided, and more than one command or process for a given touch may be invoked by providing a secondary input, such as a second touch that overlaps the first touch at least partially in time, or a key actuation that overlaps the first touch at least partially in time.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   detecting a first touch in a first region of a touch-sensitive display, at a location of a selectable element comprising a hyperlink on the touch-sensitive display of an electronic device;
   when no secondary input to the electronic device is detected during the first touch at the location of the selectable element, performing a first function associated with the selectable element by selecting the selectable element, which first function is performed according to a first event handling process;
   in response to detecting a secondary input comprising a second touch in a second region of the touch-sensitive display, which second touch overlaps at least partially in time with the first touch at the location of the selectable element, identifying a location of the second touch and performing a second function associated with the selectable element, which second function is dependent on the location of the second touch within the second region;
   wherein when the second touch is determined to be in a first area of the second region, the second function comprises displaying information relating to the hyperlink, wherein the second function is performed according to a second event handling process in which the touch is processed as a rollover command; and
   when the second touch is determined to be in a second area of the second region, the second function comprises indicating selection of text associated with the location of the selectable element, wherein the second function is performed according to another second event handling process.

2. The method of claim 1, wherein the first event handling process is one of a set of first event handling processes.

3. The method according to claim 2, further comprising:
   detecting termination of the secondary input;
   performing a function associated with a subsequent touch according to one of the set of first event handling processes.

4. The method according to claim 1, wherein the second region is a non-display area.

5. The method according to claim 1, wherein the second touch is a touch and hold gesture.

6. The method of claim 1, wherein the second event handling process is one of a set of second event handling processes.

7. The method according to claim 6, further comprising:
   detecting a subsequent touch while the secondary input is maintained;
   performing a function associated with the subsequent touch according to one of the set of second event handling processes.

8. A non-transitory computer-readable medium having computer-readable code executable by at least one processor of the electronic device to perform the method of claim 1.

9. An electronic device comprising:
   a touch-sensitive display;
   a processor coupled to the touch-sensitive display and configured to:
      detect a first touch in a first region of a touch-sensitive display, at a location of a selectable element comprising a hyperlink on the touch-sensitive display of the electronic device;
      when no secondary input to the electronic device is detected during the first touch at the location of the selectable element, perform a first function associated with the selectable element by selecting the selectable element, which first function is performed according to a first event handling process;
      in response to detecting a secondary input comprising a second touch in a second region of the touch-sensitive display, which second touch overlaps at least partially in time with the first touch at the location of the selectable element, identify a location of the second touch and perform a second function associated with the selectable element, which second function is dependent on the location of the second touch within the second region;
      wherein when the second touch is determined to be in a first area of the second region, the second function comprises displaying information relating to the hyperlink, wherein the second function is performed according to a second event handling process in which the touch is processed as a rollover command; and
      when the second touch is determined to be in a second area of the second region, the second function comprises indicating selection of text associated with the location of the selectable element, wherein the second function is performed according to another second event handling process.

10. The electronic device according to claim 9, wherein the first event handling process is one of a set of first event handling processes.

11. The electronic device according to claim 10, wherein the processor is further configured to:
    detect termination of the secondary input;

perform a function associated with a subsequent touch according to one of a set of first event handling processes.

12. The electronic device according to claim 9, wherein the second region is a non-display area.

13. The electronic device according to claim 9, wherein the second touch is a touch and hold gesture.

14. The electronic device according to claim 9, wherein the second event handling process is one of a set of second event handling processes.

15. The electronic device according to claim 9, wherein the processor is further configured to:
   detect a subsequent touch while the secondary input is maintained;
   perform a function associated with the subsequent touch according to one of the set of second event handling processes.

* * * * *